US009522625B2

(12) United States Patent
Myers

(10) Patent No.: US 9,522,625 B2
(45) Date of Patent: Dec. 20, 2016

(54) BOAT LOADING ALLIGNMENT DEVICE AND METHOD

(71) Applicant: Troy A. Myers, Norfolk, NE (US)

(72) Inventor: Troy A. Myers, Norfolk, NE (US)

( * ) Notice: Subject to any disclaimer, the term of this patent is extended or adjusted under 35 U.S.C. 154(b) by 193 days.

(21) Appl. No.: 14/291,981

(22) Filed: May 30, 2014

(65) Prior Publication Data

US 2015/0343940 A1 Dec. 3, 2015

(51) Int. Cl.
*B66F 7/06* (2006.01)
*B60P 3/10* (2006.01)

(52) U.S. Cl.
CPC .................... *B60P 3/1066* (2013.01)

(58) Field of Classification Search
CPC . B66F 11/04; B66F 2700/12; B66F 2700/123; B60S 9/00; B60S 9/02; B62D 25/2081
See application file for complete search history.

(56) References Cited

U.S. PATENT DOCUMENTS

| | | | |
|---|---|---|---|
| 3,603,465 A | 9/1971 | King | |
| 4,268,211 A | 5/1981 | Schwebke | |
| 4,507,841 A | 4/1985 | Rickert | |
| 4,529,217 A | 7/1985 | Wood | |
| 4,653,727 A | 3/1987 | Chang et al. | |
| 4,684,314 A | 8/1987 | Luth | |
| 4,749,169 A | 6/1988 | Pickles | |
| 5,199,688 A * | 4/1993 | Engel | B66F 3/12 254/126 |
| 5,339,749 A * | 8/1994 | Hirose | B23Q 1/5468 108/137 |
| 5,360,226 A | 11/1994 | Gussler | |
| 5,865,424 A * | 2/1999 | Lutz | B66F 3/12 254/126 |
| 6,237,953 B1 | 5/2001 | Farmer | |
| 6,260,752 B1 | 7/2001 | Dollesin | |
| 6,457,904 B2 | 10/2002 | Bishop | |
| 6,575,487 B1 | 6/2003 | Krause | |
| 6,695,289 B1 | 2/2004 | Micjael | |
| 7,017,933 B2 | 3/2006 | Mickley | |
| 7,988,131 B1* | 8/2011 | Carder | B66F 3/12 254/122 |

(Continued)

FOREIGN PATENT DOCUMENTS

EP  1375782  2/2004
EP  1914193  10/2007

(Continued)

*Primary Examiner* — Lee D Wilson

(57) ABSTRACT

A boat loading alignment device and method lifts a boat over a trailer and subsequently aligns and seats the boat properly on the trailer after moving the trailer from the water wherein the device minimizes time spent occupying a boat ramp. The device includes a base movable laterally on the boat trailer. A scissor arm has a bottom end coupled to the base. The scissor arm extends upwardly from the base. Each of a pair of pads is coupled to an associated one of a pair of top sections of the scissor arm. A scissor screw is coupled to the scissor arm wherein rotation of the scissor screw extends and retracts the scissor arm such that the scissor arm is configured for lifting and lowering the boat relative to support rails of the boat trailer allowing lateral adjustment of the base and the boat relative to the boat trailer.

19 Claims, 7 Drawing Sheets

(56) References Cited

U.S. PATENT DOCUMENTS

| | | | |
|---|---|---|---|
| 8,016,303 | B1 | 9/2011 | Ullman et al. |
| 8,152,100 | B2 | 4/2012 | Nichols et al. |
| 8,256,789 | B2 | 9/2012 | Bryant |
| 2008/0048161 | A1 | 2/2008 | Meyer |
| 2015/0343940 | A1* | 12/2015 | Myers .................. B60P 3/1066 414/678 |

FOREIGN PATENT DOCUMENTS

| | | |
|---|---|---|
| JP | 2012171720 | 9/2012 |
| WO | WO2012136980 | 10/2012 |

* cited by examiner

US 9,522,625 B2

BOAT LOADING ALLIGNMENT DEVICE AND METHOD

BACKGROUND OF THE DISCLOSURE

Field of the Disclosure

The disclosure relates to boat alignment devices and more particularly pertains to a new boat alignment device and method for safely lifting a boat over a trailer and subsequently aligning and seating the boat properly on the trailer after moving the trailer from the water wherein the device minimizes time spent occupying a boat ramp.

SUMMARY OF THE DISCLOSURE

An embodiment of the disclosure meets the needs presented above by generally comprising a base configured for being coupled to a boat trailer such that the base is movable laterally relative to a longitudinal axis of the boat trailer. A scissor arm has a bottom end coupled to the base. The scissor arm extends upwardly from the base. Each of a pair of pads is coupled to an associated one of a pair of top sections of the scissor arm. A scissor screw is coupled to the scissor arm wherein rotation of the scissor screw extends and retracts the scissor arm such that the scissor arm is configured for lifting and lowering the boat relative to support rails of the boat trailer allowing lateral adjustment of the base and the boat relative to the boat trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
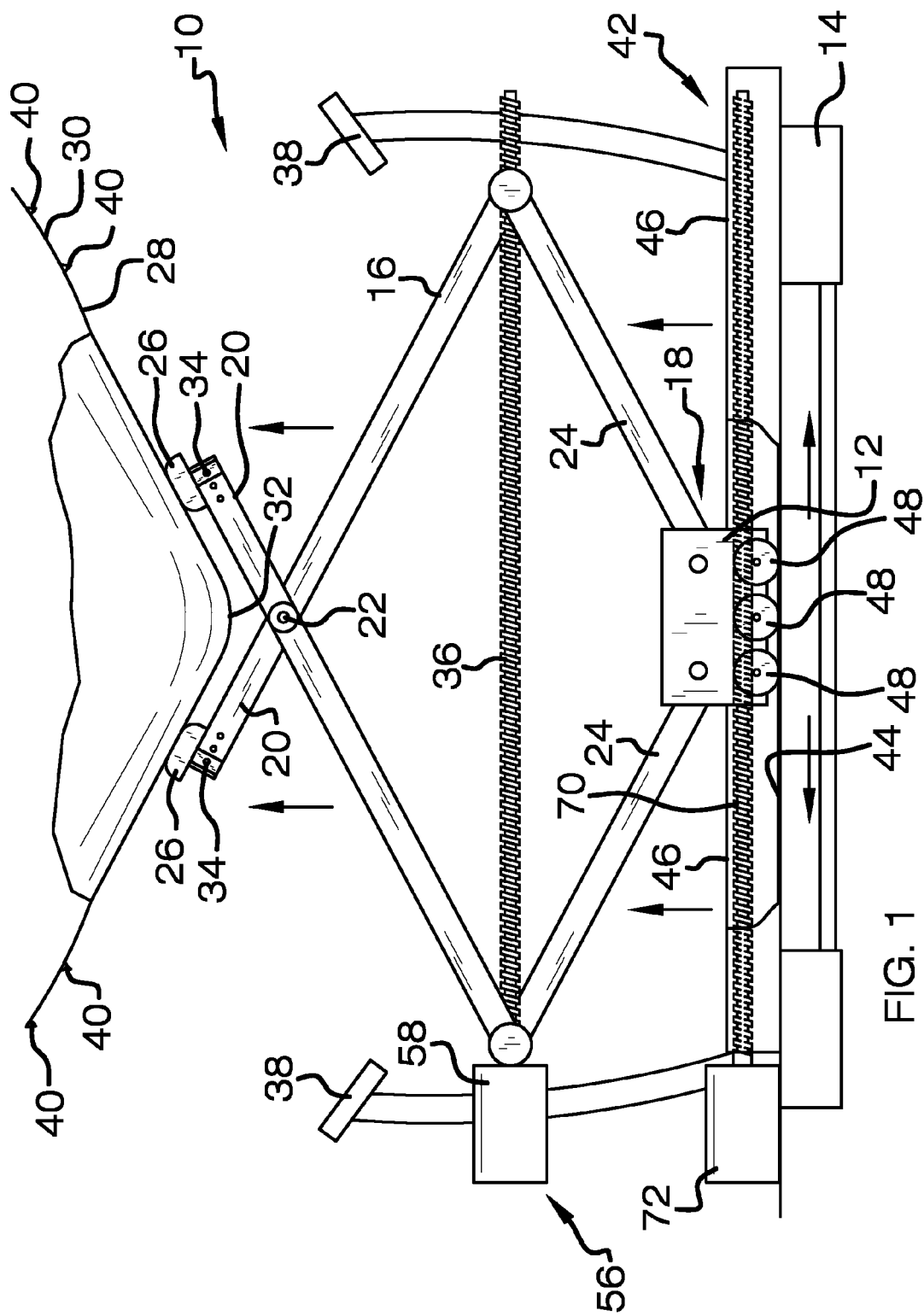
FIG. 1 is a rear view of a boat loading alignment device according to an embodiment of the disclosure.

With reference now to the drawings, and in particular to FIGS. 1 through 7 thereof, a new boat alignment device embodying the principles and concepts of an embodiment of the disclosure and generally designated by the reference numeral 10 will be described.

As best illustrated in FIGS. 1 through 7, the boat loading alignment device 10 generally comprises a base 12 configured for being coupled to a boat trailer 14 such that the base 12 is movable laterally relative to a longitudinal axis of the boat trailer 14. A scissor arm 16 has a bottom end 18 coupled to the base 12. The scissor arm 16 extends upwardly from the base 12. The scissor arm 16 has a pair of opposed top sections 20 extending from a pivotal top junction 22 of said scissor arm 16. The scissor arm 16 also has a pair of opposed bottom sections 24. Each of the bottom sections 24 is pivotally coupled to the base 12. Each of a pair of pads 26 is coupled to an associated one of the top sections 20 of the scissor arm 16. The pads 26 face upwardly and inwardly towards each other wherein the pads 26 are configured to abut a hull 28 of a boat 30 on opposite sides of a keel 32 of the boat 30. Each of the pads 26 is removably coupled to the associated top section 20 of the scissor arm 16. The pads 26 may be replaced as needed or the pads 26 may be provided in sets having different shapes designed to best fit a particular type, shape, or brand of boat 30. Each of a pair of pins 34 couples an associated one of the pads 26 to the associated top section 20 of the scissor arm 16 wherein each pad 26 is configured to pivot relative to the associated top section 20 for evenly distributing pressure from the pad 26 onto the boat 30 when the pads 26 abut the boat 30.

An elongated scissor screw 36 is coupled to the scissor arm 16 wherein rotation of the scissor screw 36 in a first direction extends the scissor arm 16 such that the pads 26 abut the boat 30 and the scissor arm 16 lifts the boat 30 over support rails 38 of the boat trailer 14. The base 12 is positionable laterally on the boat trailer 14 as the scissor arm 16 is extended to lift the boat 30 and allow positioning of the pads 26 in safe and secure positions on the hull 28. The scissor screw 36 is rotatable in a second direction wherein the scissor arm 16 is retracted such that the scissor arm 16 lowers the boat 30 onto the support rails 38 of the boat trailer 14 after lateral adjustment of the base 12 relative to the boat trailer 14 to position the support rails 38 between ridges 40 or the like on the hull 28. Thus, the boat 30 is positioned on the boat trailer 14 in proper alignment to safely transport the boat 30 on the boat trailer 14 while minimizing or eliminating unnecessary stress on the hull 26 of the boat 30.

The base 12 is positioned in a track 42 having a bottom wall 44 and a pair of side walls 46 coupled to and extending upwardly from the bottom wall 44. The base 12 is positioned in the track 42 between the side walls 46. Each of a plurality of wheels 48 is coupled to the base 12 supporting the base 12 on the bottom wall 44 of the track 42 and facilitating movement of the base 12 in the track 42. A pair of channels 50 may extend along the bottom wall 44 of the track 42. Each of the wheels 48 is positioned in an associated one of the channels 50. Spacing between the side walls 46 of the track 42 may also be complementary to a width of the base 12 to further stabilize the base within the track 42. The channels 50 may be formed by a pair of spaced parallel rails 52 coupled to a top surface 54 of the bottom wall 44 of the track 42. Each of the channels 50 is positioned between an associated one of the rails 52 and an associated one of the side walls 46 of the track 42.

Figure 2:
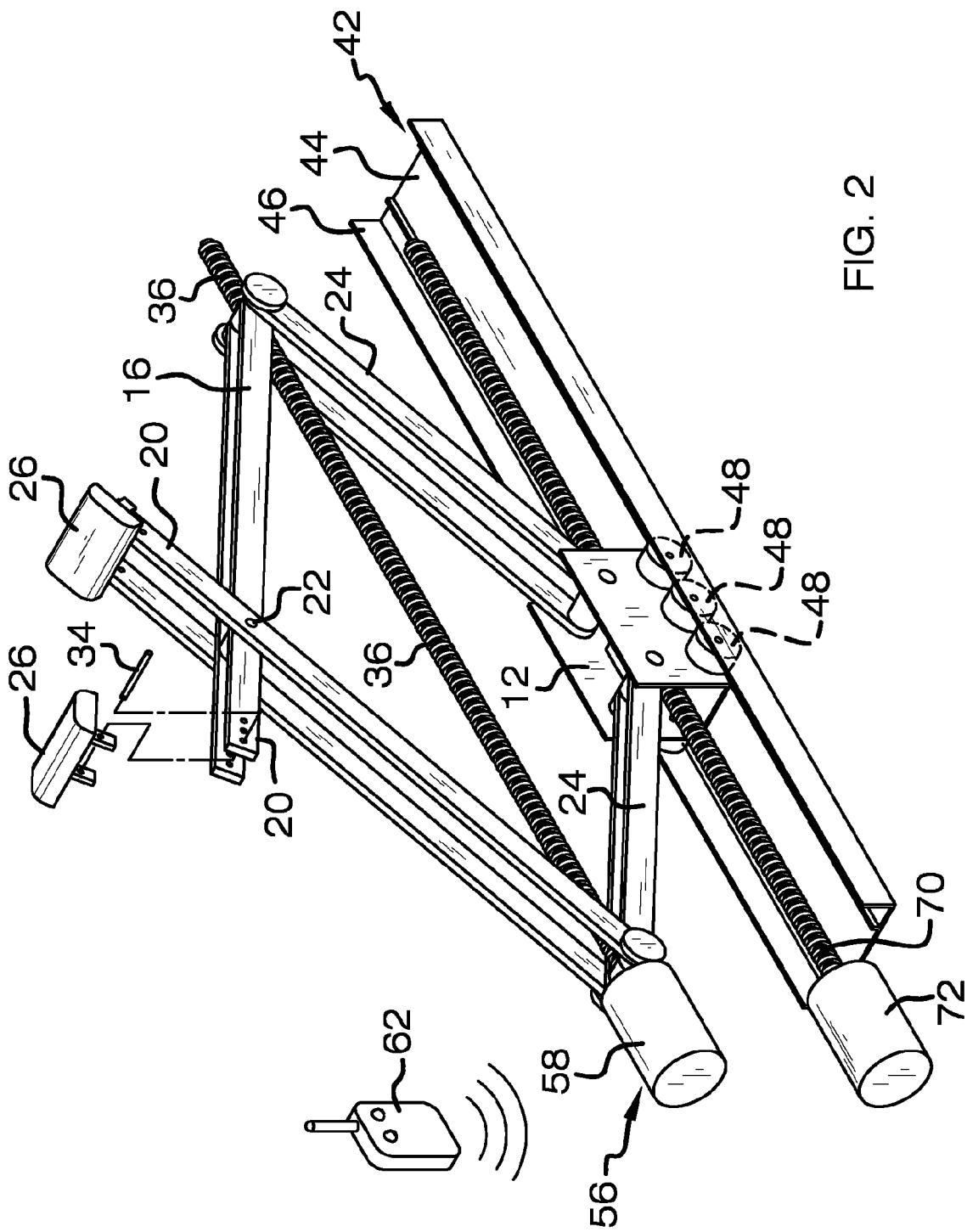
FIG. 2 is a partially exploded top front side perspective view of an embodiment of the disclosure.
Figure 3:
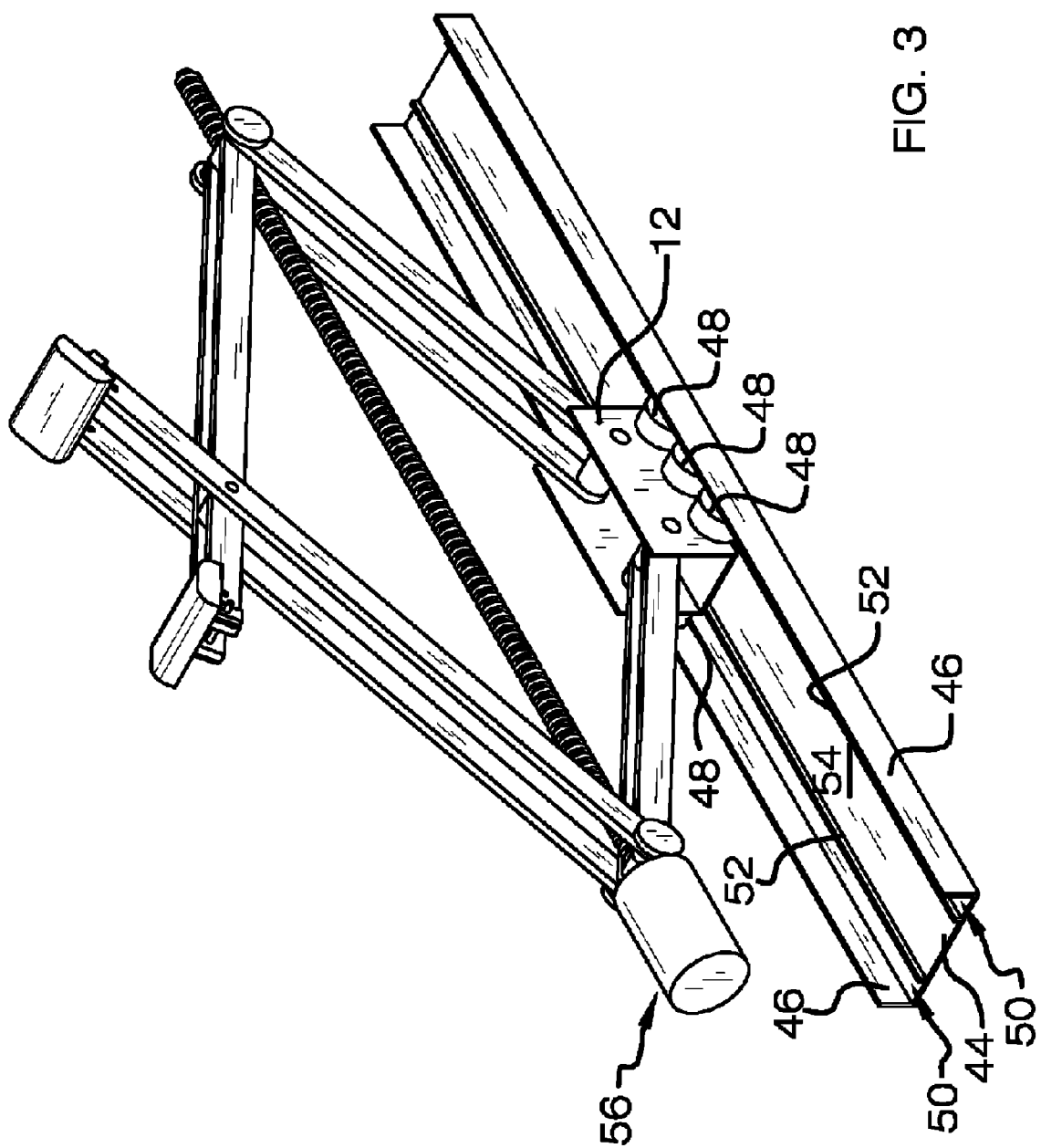
FIG. 3 is a top front side perspective view of an embodiment of the disclosure.
Figure 4:
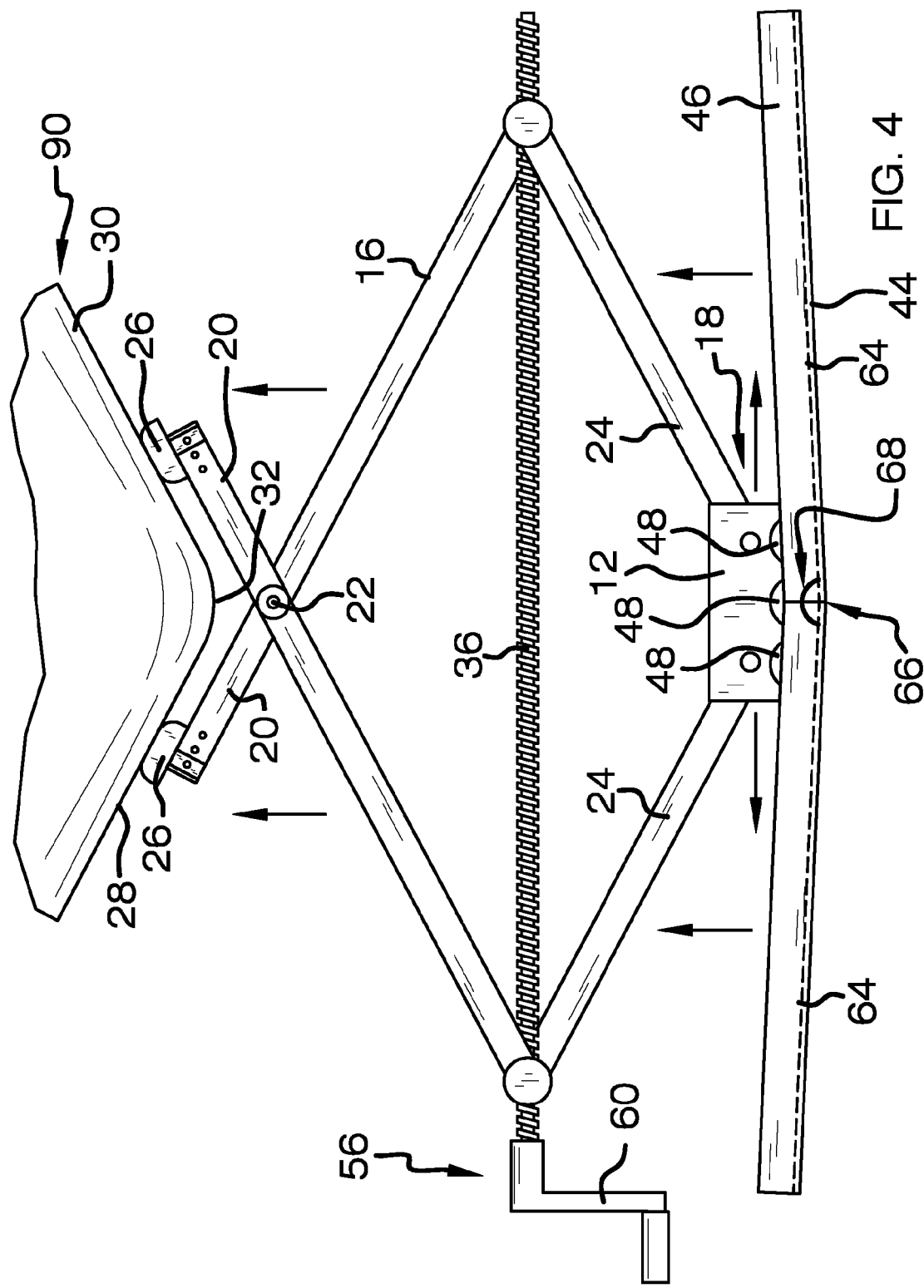
FIG. 4 is a rear view of an embodiment of the disclosure.
Figure 5:
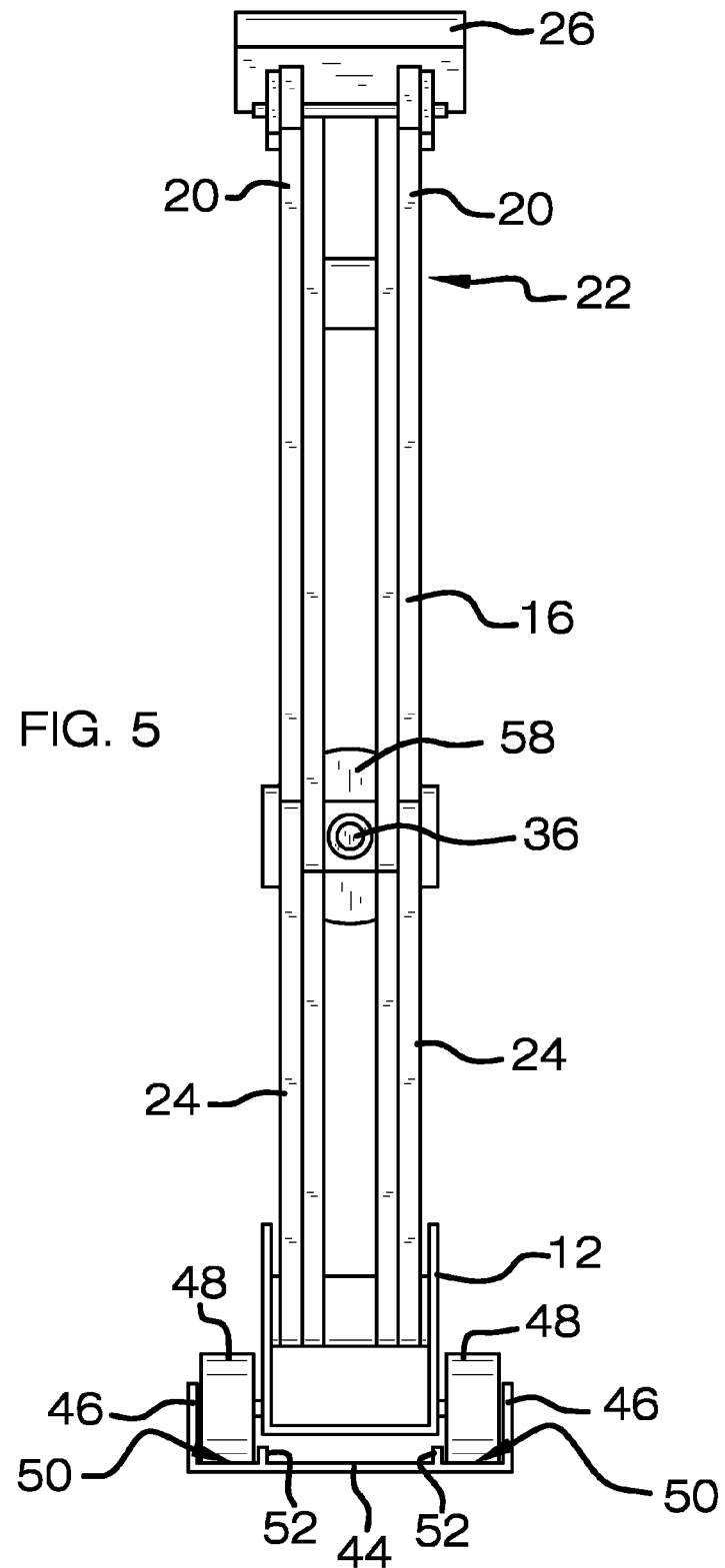
FIG. 5 is a side view of an embodiment of the disclosure.

In embodiments of the disclosure, an actuator 56 is coupled to the scissor screw 36. The actuator 56 urges the scissor screw 36 to rotate in a desired direction to operate the scissor arm 16. In alternative embodiments of the device 10, the actuator 56 is one of a scissor motor 58 coupled to the scissor screw 36, as shown in FIGS. 1 through 3 and 5, and a hand crank 60 coupled to the scissor screw 36, as shown in FIG. 4. The hand crank 60 may attach to the scissor screw 36 using a socket connection or similar conventional means wherein the hand crank 60 is removable from the scissor screw 36 for storage. The scissor motor 58 rotates the scissor screw 36 in a desired one of the first direction and the second direction and may be controlled by operational controls on the scissor motor 58 or through a remote control 62. In the manual embodiment, manipulation of the hand crank 60 selectively rotates the scissor screw 36 in the desired direction. In an embodiment shown in FIG. 6, the actuator 56 may be a socket screw head 98 which is engaged and rotated by a driving tool 100.

Figure 6:
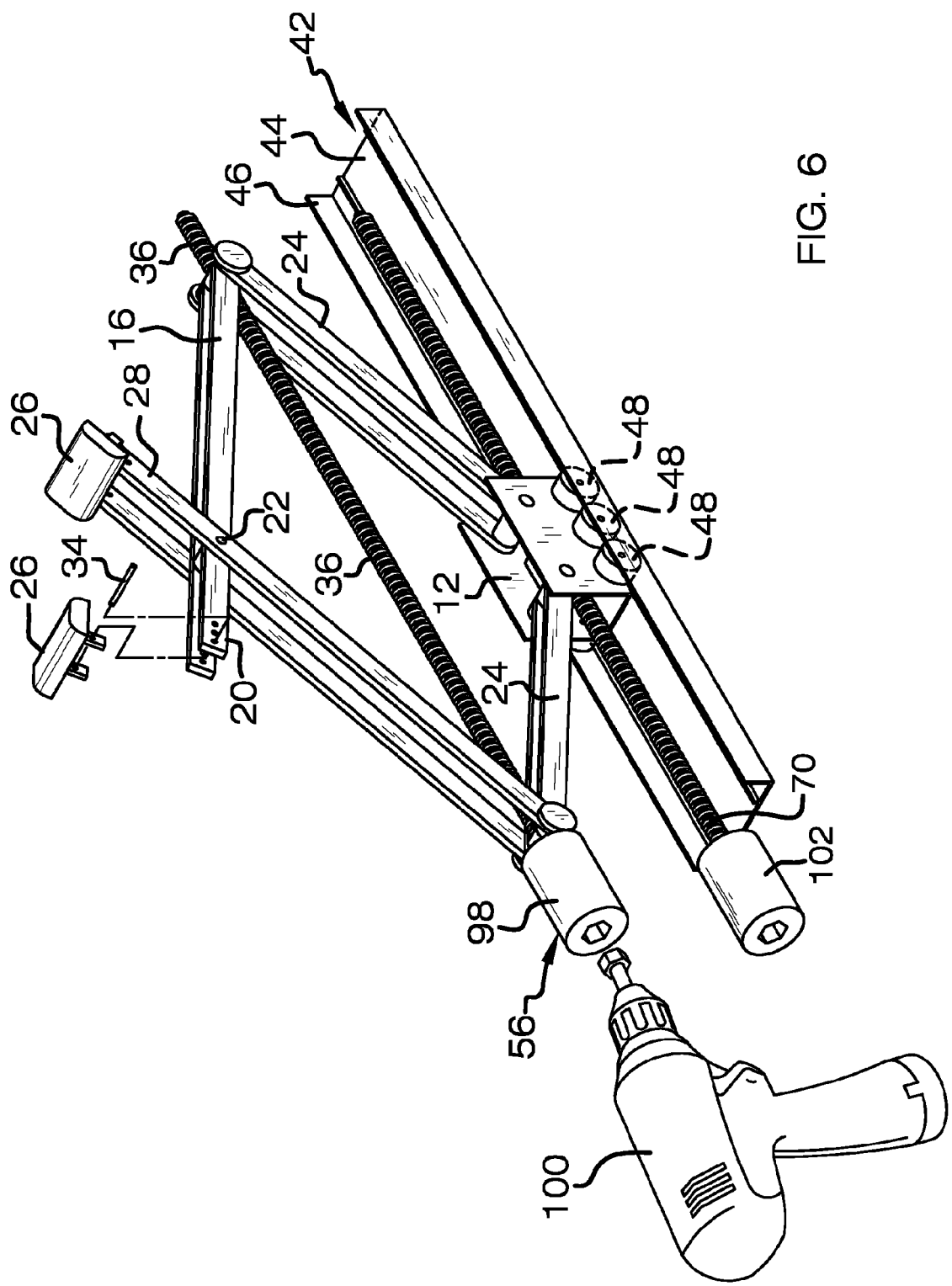
FIG. 6 is a partially exploded top front side perspective view of an embodiment of the disclosure.
Figure 7:
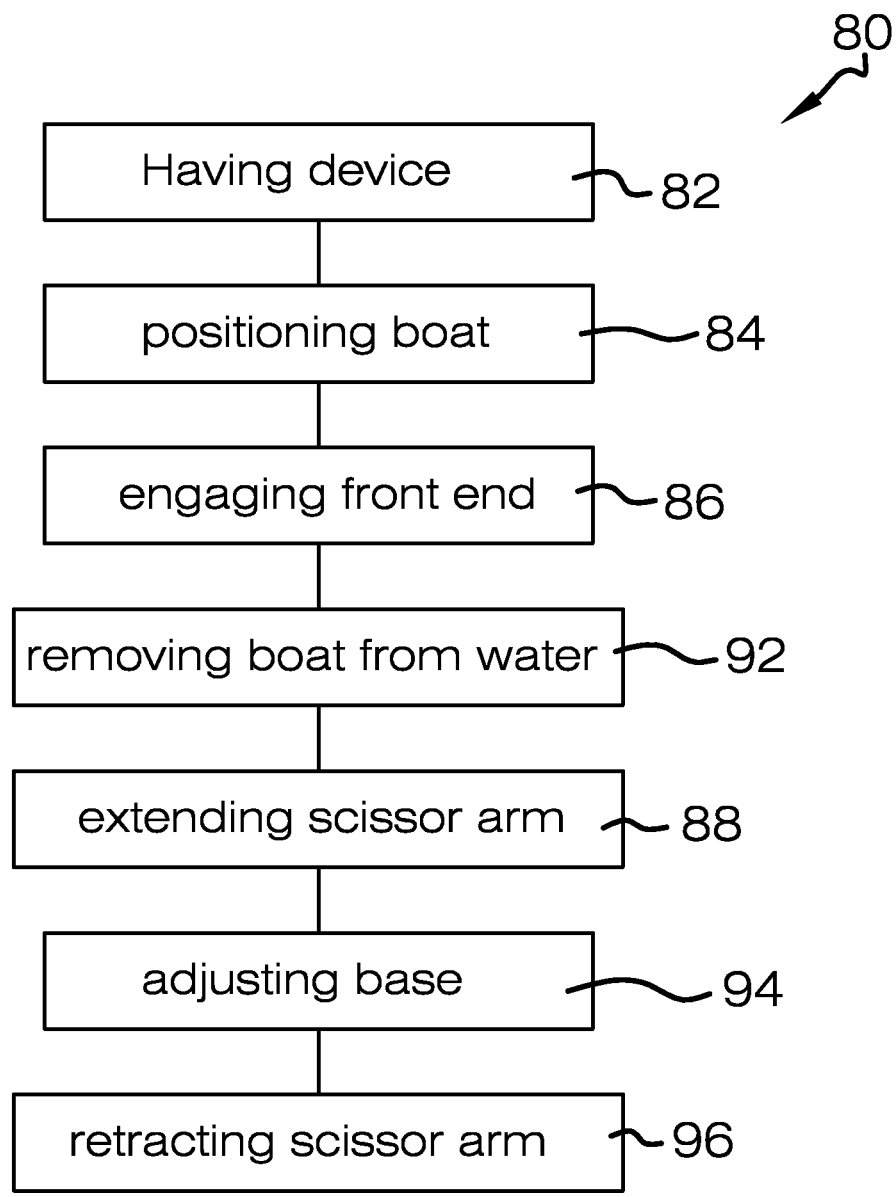
FIG. 7 is a schematic view of a method according to an embodiment of the disclosure.

In various embodiments of the device 10 consistent with the disclosure, the base 12 may be moved laterally relative to the boat trailer 14 in different ways. As shown in FIGS. 1 through 6, the base 12 is supported on the wheels 48 in the track 42. The top surface 54 of the bottom wall 44 is planar, as shown in FIG. 3, allowing the base 12 to be moved manually through exerting lateral force on the boat 30. Alternatively, as shown in FIG. 4, the bottom wall 44 may comprise a pair of outer sections 64. The outer sections 64 are angled such that the outer sections 64 extend laterally upward and away from a center 66 of the track 42 wherein the base 12 is gravitationally urged towards the center 66 of the track 42. The center 66 of the track 42 is aligned with the boat trailer 14 to provide the desired orientation of the boat 30 when the base 12 is at the center 66 of the track 42. An angle 68 formed by the outer sections 64 of the track 42 is between 160 and 178 degrees providing sufficient incline to facilitate centering the base 12. This embodiment is used typically with the hand crank 60. Another embodiment of the device 10 shown in FIGS. 1 and 2, provides a base screw 70 configured for coupling to the track 42 or the boat trailer 14 in a laterally fixed position relative to the boat trailer 14. The base screw 70 engages the base 12 within the track 42 wherein rotation of the base screw 70 urges the base 12 to move laterally relative to the boat trailer 14. The base screw 70 may be operated manually or a base motor 72, as shown in FIGS. 1 and 2, may be coupled to the base screw 70. The base motor 72 is statically coupled to the boat trailer 14 in a conventional manner and rotates the base screw 70 in a selectable direction. The base motor 72 may be operated independently of the scissor motor 58 using separate controls on the base motor 72 or the remote control 62. In FIG. 6, the base screw 70 may be replaced by a socket screw head 102 which is free to rotate and statically coupled to the base screw 70. Thus, the base screw 70 may be rotated by the driving tool 100 similar to the scissor screw 36.

It is specifically contemplated that elements of the disclosed embodiments may be interchanged, wherever such elements are not mutually exclusive, to form additional variations consistent with the disclosure of the invention.

In use, the device 10 provides for a method 80 of aligning the boat 30 on the boat trailer 14, as shown generally in FIG. 6. The method 80 comprises an initial step 82 of having the device 10 consistent with any of the embodiments discussed more fully above. A secondary step 84 is positioning the boat 30 in a body of water and over the boat trailer 14 in a conventional manner commonly performed while occupying a boat ramp or the like. Another step 86 is engaging a front end of the boat 30 to a forward support (not shown) on the boat trailer 14. An additional step 92 is removing the boat trailer 14 from the body of water such that the boat 30 is supported on the boat trailer 14. Yet another step 88, performed after step 92, is extending the scissor arm 16 wherein the pads 26 abut the boat 30 between a center of gravity of the boat 30 and a rear end 90 of the boat 30 to lift the rear end 90 of the boat 30 relative to the boat trailer 14. Still another step 94 is laterally adjusting the base 12 wherein the boat 30 is aligned relative to the boat trailer 14 such that the support rails 38 are vertically aligned with the boat 30 in a desired manner. Another step 96 is retracting the scissor arm 16 wherein the boat 30 is lowered onto the support rails 38 of the boat trailer 14 such that the support rails 38 abut the hull 28 of the boat 30 between the ridges 40 extending outwardly from the hull 28 of the boat 30. The boat 30 may then be otherwise secured to the boat trailer 14 in conventional fashion in preparation for travel or storage.

In use, the method 80 facilitates efficient proper alignment of the boat 30 after removing the boat trailer 14 from a boat ramp to minimize time spent on the boat ramp to remove the boat 30 from the body of water. The device 10 obviates the need to potentially reverse the boat trailer back down the boat ramp or the like to reposition the boat 30 on the boat trailer 14 when the boat 30 is improperly positioned on the boat trailer 14. The device 10 further reduces the time required to support the boat 30 sufficiently in a temporary manner permitting efficient sequential use of a single boat ramp by multiple users.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A boat loading alignment device comprising:
a boat trailer having support rails;
a base being coupled to said boat trailer such that said base is movable laterally relative to a longitudinal axis of the boat trailer;
a scissor arm having a bottom end coupled to said base, said scissor arm extending upwardly from said base, said scissor arm having a pair of opposed top sections;
a pair of pads, each said pad being coupled to an associated one of said top sections of said scissor arm; and
a scissor screw coupled to said scissor arm wherein rotation of said scissor screw in a first direction extends said scissor arm such that said pads are elevated over said support rails and are configured for abutting a boat such that said scissor arm lifts the boat over said support rails of the boat trailer, said scissor screw being rotatable in a second direction wherein said scissor arm is retracted such that said pads are lowered below said support rails wherein said scissor arm is configured for lowering the boat onto the support rails of the boat trailer after lateral adjustment of said base relative to the boat trailer.

2. The device of claim 1, further comprising a track having a bottom wall and a pair of side walls coupled to and extending upwardly from said bottom wall, said base being positioned in said track between said side walls.

3. A boat loading alignment device comprising:
a base configured for being coupled to a boat trailer such that said base is movable laterally relative to a longitudinal axis of the boat trailer;
a scissor arm having a bottom end coupled to said base, said scissor arm extending upwardly from said base, said scissor arm having a pair of opposed top sections;
a pair of pads, each said pad being coupled to an associated one of said top sections of said scissor arm;
a scissor screw coupled to said scissor arm wherein rotation of said scissor screw in a first direction extends said scissor arm such that said pads are configured for abutting a boat and said scissor arm lifts the boat over support rails of the boat trailer, said scissor screw being rotatable in a second direction wherein said scissor arm is retracted such that said scissor arm is configured for lowering the boat onto the support rails of the boat trailer after lateral adjustment of said base relative to the boat trailer;
a track having a bottom wall and a pair of side walls coupled to and extending upwardly from said bottom wall, said base being positioned in said track between said side walls; and
a plurality of wheels coupled to said base, said wheels supporting said base on said bottom wall of said track.

4. The device of claim 3, further comprising a pair of channels extending along said bottom wall of said track, each of said wheels being positioned in an associated one of said channels.

5. The device of claim 4, further comprising a pair of spaced parallel rails coupled to a top surface of said bottom wall of said track, each of said channels being positioned between an associated one of said rails and an associated one of said side walls of said track.

6. The device of claim 1, further comprising said scissor arm having a pair of opposed bottom sections, each of said bottom sections being pivotally coupled to said base.

7. The device of claim 2, further comprising said bottom wall having a pair of outer sections, said outer sections being angled such that said outer sections extend laterally upward and away from a center of said track wherein said base is gravitationally urged towards said center of said track.

8. A boat loading alignment device comprising:
a base configured for being coupled to a boat trailer such that said base is movable laterally relative to a longitudinal axis of the boat trailer;
a scissor arm having a bottom end coupled to said base, said scissor arm extending upwardly from said base, said scissor arm having a pair of opposed top sections;
a pair of pads, each said pad being coupled to an associated one of said top sections of said scissor arm;
a scissor screw coupled to said scissor arm wherein rotation of said scissor screw in a first direction extends said scissor arm such that said pads are configured for abutting a boat and said scissor arm lifts the boat over support rails of the boat trailer, said scissor screw being rotatable in a second direction wherein said scissor arm is retracted such that said scissor arm is configured for lowering the boat onto the support rails of the boat trailer after lateral adjustment of said base relative to the boat trailer;
a track having a bottom wall and a pair of side walls coupled to and extending upwardly from said bottom wall, said base being positioned in said track between said side walls; and
said bottom wall having a pair of outer sections, said outer sections being angled such that said outer sections extend laterally upward and away from a center of said track wherein said base is gravitationally urged towards said center of said track, an angle formed by said outer sections of said track being between 160 and 178 degrees.

9. The device of claim 1, further comprising an actuator coupled to said scissor screw, said actuator selectively urging said scissor screw to rotate.

10. The device of claim 9, further comprising said actuator being a scissor motor coupled to said scissor screw, said scissor motor selectively rotating said scissor screw in a desired one of said first direction and said second direction.

11. The device of claim 9, further comprising said actuator being a hand crank coupled to said scissor screw wherein manipulation of said hand crank selectively rotates said scissor screw.

12. The device of claim 1, further comprising a base screw configured for coupling to the trailer in a laterally fixed position relative to the trailer, said base screw engaging said base wherein rotation of said base screw urges said base to move laterally relative to the trailer.

13. The device of claim 12, further comprising a base motor coupled to said base screw, said base motor selectively rotating said base screw in a selectable direction.

14. The device of claim 1, further comprising each of said pads being removably coupled to said associated top section of said scissor arm.

15. The device of claim 1, further comprising a pair of pins, each of said pins pivotally coupling an associated one of said pads to said associated top section of said scissor arm wherein each said pad is configured to evenly distribute pressure from said pad onto the boat when said pads abut the boat.

16. A boat loading alignment device comprising:
a base configured for being coupled to a boat trailer such that said base is movable laterally relative to a longitudinal axis of the boat trailer;
a scissor arm having a bottom end coupled to said base, said scissor arm extending upwardly from said base, said scissor arm having a pair of opposed top sections, said scissor arm having a pair of opposed bottom sections, each of said bottom sections being pivotally coupled to said base;
a pair of pads, each said pad being coupled to an associated one of said top sections of said scissor arm, each of said pads being removably coupled to said associated top section of said scissor arm;
a scissor screw coupled to said scissor arm wherein rotation of said scissor screw in a first direction extends said scissor arm such that said pads are configured for abutting a boat and said scissor arm lifts the boat over support rails of the boat trailer, said scissor screw being rotatable in a second direction wherein said scissor arm is retracted such that said scissor arm is configured for lowering the boat onto the support rails of the boat trailer after lateral adjustment of said base relative to the boat trailer;

a track having a bottom wall and a pair of side walls coupled to and extending upwardly from said bottom wall, said base being positioned in said track between said side walls;

a plurality of wheels coupled to said base, said wheels supporting said base on said bottom wall of said track;

a pair of channels extending along said bottom wall of said track, each of said wheels being positioned in an associated one of said channels;

a pair of spaced parallel rails coupled to a top surface of said bottom wall of said track, each of said channels being positioned between an associated one of said rails and an associated one of said side walls of said track;

an actuator coupled to said scissor screw, said actuator selectively urging said scissor screw to rotate, said actuator being one of a scissor motor coupled to said scissor screw and a hand crank coupled to said scissor screw, said scissor motor selectively rotating said scissor screw in a desired one of said first direction and said second direction, manipulation of said hand crank selectively rotating said scissor screw; and a pair of pins, each of said pins pivotally coupling an associated one of said pads to said associated top section of said scissor arm wherein each said pad is configured to evenly distribute pressure from said pad onto the boat when said pads abut the boat.

17. The device of claim 16, further comprising:

a base screw configured for coupling to the trailer in a laterally fixed position relative to the trailer, said base screw engaging said base wherein rotation of said base screw urges said base to move laterally relative to the trailer; and a base motor coupled to said base screw, said base motor selectively rotating said base screw in a selectable direction.

18. The device of claim 17, further comprising:

said bottom wall having a pair of outer sections, said outer sections being angled such that said outer sections extend laterally upward and away from a center of said track wherein said base is gravitationally urged towards said center of said track; and an angle formed by said outer sections of said track being between 160 and 178 degrees.

19. A boat loading alignment device comprising:

a base configured for being coupled to a boat trailer such that said base is movable laterally relative to a longitudinal axis of the boat trailer;

a scissor arm having a bottom end coupled to said base, said scissor arm extending upwardly from said base, said scissor arm having a pair of opposed top sections;

a pair of pads, each said pad being coupled to an associated one of said top sections of said scissor arm; and a scissor screw coupled to said scissor arm wherein rotation of said scissor screw in a first direction extends said scissor arm such that said pads are configured for abutting a boat and said scissor arm lifts the boat over support rails of the boat trailer, said scissor screw being rotatable in a second direction wherein said scissor arm is retracted such that said scissor arm is configured for lowering the boat onto the support rails of the boat trailer after lateral adjustment of said base relative to the boat trailer; and an actuator coupled to said scissor screw, said actuator selectively urging said scissor screw to rotate, said actuator being a socket screw head coupled to said scissor screw wherein said scissor screw is configured for being engaged and rotated by a driving tool.

\* \* \* \* \*